Patented Sept. 2, 1930

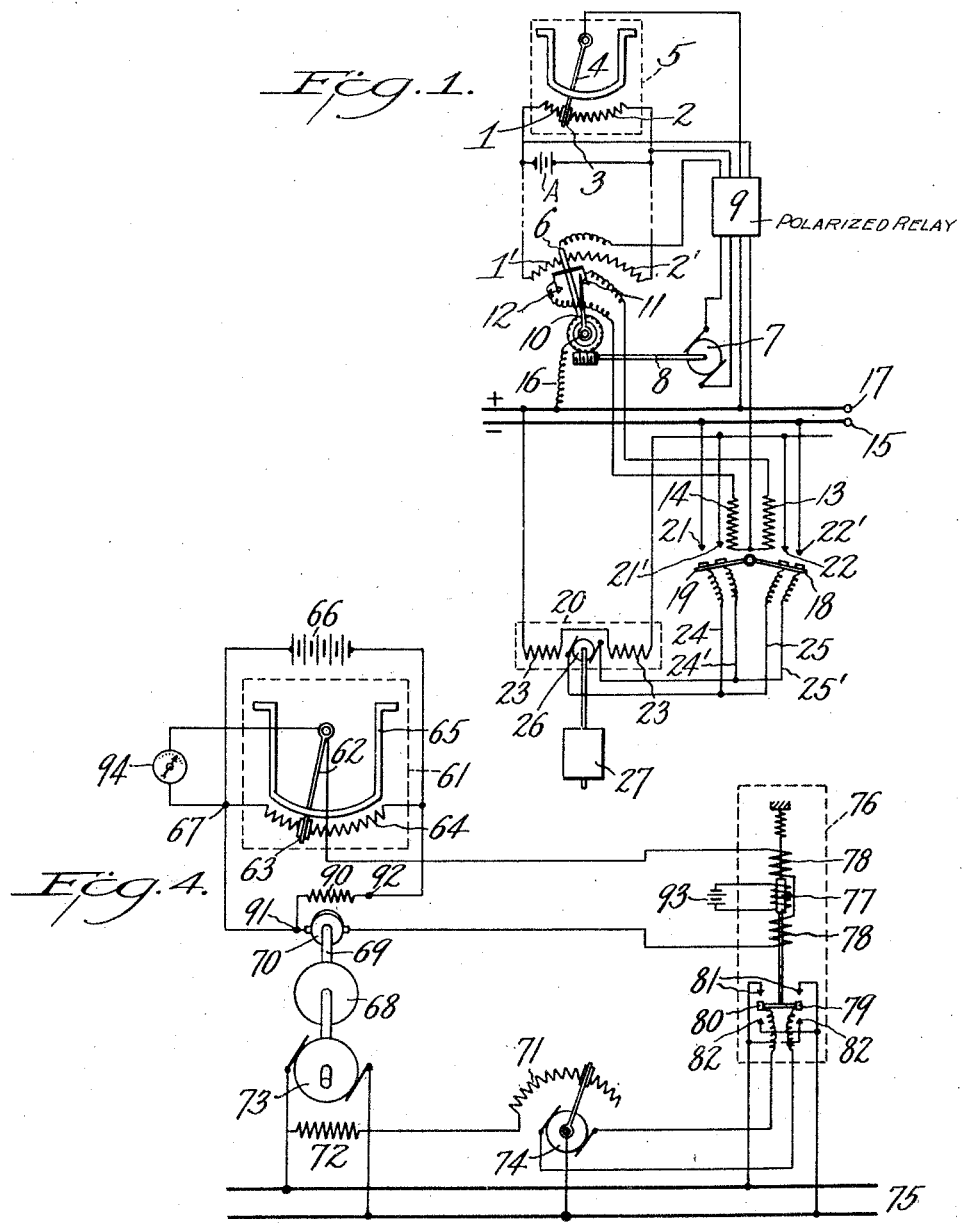

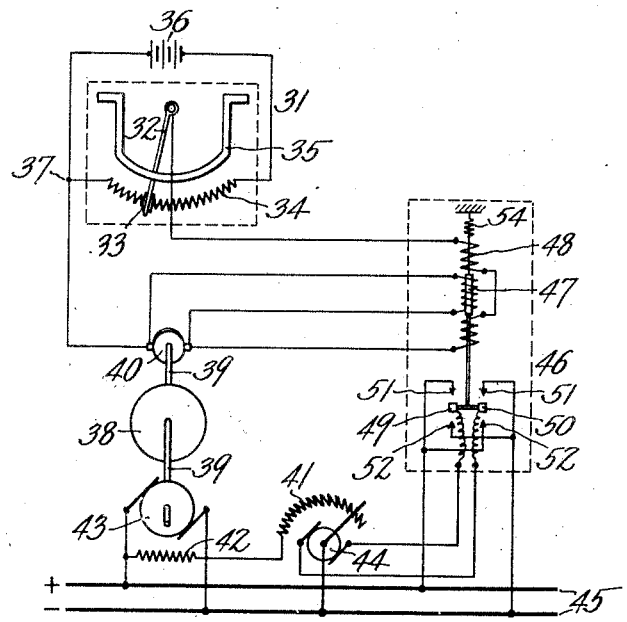

1,774,673

UNITED STATES PATENT OFFICE

MANFRED SCHLEICHER AND WILHELM LIESEGANG, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

SYSTEM FOR THE REGULATION OF MACHINES

Application filed December 21, 1926, Serial No. 156,180, and in Germany December 21, 1925.

The present invention relates to a system or arrangement for regulating a machine and is particularly suitable for regulating an electromotor which drives a power machine or other means.

In the systems known for regulating a value in dependence upon another value, an element which more or less directly influences the value to be regulated is adjusted by the action of the system. Such an arrangement has the disadvantage that disturbing influences which may happen in the transmission system are not compensated.

To give an example, reference is made to a system for regulating the speed of a motor driving a machine in dependence upon the position of a pointer. The said machine may be a water pump feeding a tube and the pointer is supposed to measure the intensity of the water current passing through this tube. A shunt motor, for instance, may be used to operate the pump. It will be understood that in the well known systems for automatically controlling the shunt motor by means of such a pointer a regulating resistance in the circuit of the motor must be adjusted so that in the case of normal voltage in the electric line the quantity of water delivered by the pump corresponds to a given position of the pointer. In such a system, however, variations of the voltage feeding the motor would cause a false regulation of the pump.

In order to overcome this difficulty in a system for regulating a machine according to the invention an additional element controlling the output of the machine is inserted into the system in such a manner that the regulation of the machine is only finished when the second element indicates that the desired effect has actually occurred. For this purpose a dynamo driven by the machine to be regulated can be made use of, the voltage of which varies with the speed of the dynamo, but it is obvious that also other controlling devices may be arranged in carrying out this invention.

In the drawings affixed to this specification and forming part thereof several embodiments of the invention are illustrated by way of example.

In the drawings:

Fig. 1 shows an arrangement the operation of which is controlled by an additional pointer.

Fig. 2 is a system with an additional dynamo as controlling means.

Fig. 3 is a modification of Fig. 2.

Fig. 4 shows a system in which an electromagnetically excited dynamo and special transmitting means are arranged.

Referring to Fig. 1 the resistances 1, 2 and 1', 2' are connected to form a Wheatstone bridge. Over the resistances 1 and 2 moves a pointer 4 carrying a contact 3 which is periodically moved downwards by a depression bar. These elements belong to the transmitter 5 of the system. At the receiver side a contact 6 is disposed to be adjusted by a motor 7 by way of gear 8 in such a manner that the contacts 3 and 6 have always equal potentials which are supplied by the common source A. For this purpose the motor circuit is connected to a polarized relay 9, which for the sake of simplicity in this figure is only indicated by a rectangle.

According to the invention an additional pointer 10 cooperates wth two contacts 11 and 12 rigidly mounted upon the arm of the contact 6. This pointer 10 measures the amount to be regulated at the receiving station and makes contact with 11 or 12 if the desired effect has not occurred. The contacts 11 and 12 are connected through the relay coils 13 and 14 to the negative pole 15 of a source of direct current, the positive pole 17 of which is connected over the wire 16 to the pointer 10. Therefore the contact 10, 11 being closed the coil 13 is excited and attracts its armature 18. If the pointer 10 contacts at 12 a circuit through the other coil 14 is established and now that coil attracts its armature 19. Thereby the circuit including a motor 20 is closed either over the contacts 21, 21' or over the contacts 22, 22'. This circuit runs from + pole 17, to stator coil 23, contact 21' or 22, line 24' or 25, rotor 26, line 24, and contact 21 or line 25' and contact 22' to − pole 15. It will be understood that the motor 20 rotates in opposite directions according to the excitation of relay coil 14 or 13. The machine 27 mounted upon the shaft of the motor 20 may be a pump the output of which is measured by the pointer 10. The regulation of the machine 27 is suspended so long as the pointer 10 interrupts the contact at 11 and 12. The position of the pointer 10 then corresponds to that of the contact 6.

In many cases, it is suitable to control the rate of working of the machine to be regulated by an additional dynamo as shown in Fig. 2 by way of example. Referring to this figure, 31 is the transmitter which comprises a pointer 32 and a resistance 34 connected with both ends to the poles of a battery 36. By means of the depressor 35 the pointer 32 is periodically pressed on the resistance 34 for closing the contact 33. Such a transmitter permits the employment of sensitive measuring devices at the transmitter station. A pointer adjusted by strong directing forces, however, can continuously slide on the resistance. It will be understood that the voltage between the end 37 of the resistance and the pointer contact 33 changes in correspondence with the movement of the pointer. According to the invention the voltage between the points 37 and 33 is balanced by the voltage generated by a small dynamo 40 which is mounted upon the shaft 39 of the machine 38 to be regulated. In the circuit of the dynamo 40 a relay 46 is inserted which in a well-known manner regulates an auxiliary resistance 41 in the circuit of the stator coil 42 of the driving motor 43. A small motor 44 is shown in the drawing for turning the regulating element of the resistance 41. The circuit of this motor is led over the contacts 49, 50 of the relay 46 the armature 47 of which is polarized by the dynamo current. The direction of the current in the circuit of the motor 44 depends upon the position of the relay contacts 49, 50. If these contacts touch the upper stationary contacts 51 the motor 44 is caused, to rotate for instance, to the right, while the closing of contacts 49, 52 and 50, 52 produces a rotation to the left. In de-energized condition the relay 46 holds its contacts 49, 50 under the influence of a spring 54 in the no-contact position represented in the drawing. This happens when the coil 48 of relay 46 receives no current that is, when the voltage between 37, 33 and the voltage at the dynamo 40 compensate.

The invention is limited neither to a distinct dependency of the pointer's deflection from the value which the pointer indicates nor to a distinct dependency between the voltage and the speed of the additional dynamo. The voltage divided 33, 34 may be disposed in such a manner that each position of the pointer contact 33 corresponds to a partial voltage 33, 37 equal to that voltage which is produced by the dynamo 40 when rotating with the coordinated number of revolutions.

Sometimes the use of alternating instead of direct current may be advisable, if the source of direct current, for instance, has not sufficient constancy of voltage. In such cases the arrangement illustrated in Fig. 3 can be employed. Referring to Fig. 3 the dynamo 55 takes the place of dynamo 40 and battery 36 of Fig. 2. The alternating current dynamo 55 is preferably provided with a movable permanent magnet system and stationary coils, this type being well known. The voltage at the ends of the voltage divider 56 is kept constant by connecting in series therewith a suitable iron resistance 57 which maintains a constant intensity of current in the circuit. If desired the voltage divider and the iron resistance may be replaced by a highly saturated choke coil or other means known for such purposes. The partial voltage between the points 33' and 37' is balanced by a part of the voltage generated by the dynamo 55 and depending upon the speed of the dynamo. The compensating voltage is taken from another voltage divider between the points 58, 59. The relay 46' is connected to the points 59 and 37'. The construction and the operation of the relay 46' is quite similar to the relay 46 of Fig. 2.

In order to avoid the influence of undesired voltage variations in a direct current arrangement a dynamo having a field electromagnet arranged as shown in Fig. 4 may be provided. Referring to Fig. 4 the transmitter 61 comprises a pointer 62 moving over a voltage divider resistance 64. A depression bar 65 periodically presses the pointer 62 on the resistance 64. As source of current a battery 66 is represented. Upon the shaft of the machine 68 to be regulated is mounted a dynamo 70 the voltage of which is balanced by the voltage between 67 and 63. In the circuit of the dynamo 70 is arranged the coil 78 of a relay 76 which controls the circuit of an auxiliary motor 74. This motor regulates a resistance 71 in the circuit of the field winding 72 of the main motor 73 driving the machine 68. The armature contacts 79, 80 of the relay are arranged to cooperate with the stationary contacts 81, 82 which are connected to the direct current lines 75. The polarizing coil 77 is fed from the battery 93. The dynamo 70 has a field electromagnet the winding 90 of which is connected to the battery 66. The circuit runs from the battery 66 over the point 67 dividing then into two branches one leading over the coil 90 back to the battery and the other comprising the dynamo armature, the coils 78, the pointer 62, the contact 63 and a part of the resistance 64. If desired a series or parallel resistance may be inserted in the circuit of the field winding 90.

The voltage generated by the dynamo 70 must be proportional to the voltage of battery 66 which is effective on the field winding 90. Therefore the dynamo is preferably constructed so that its characteristic curve inclines approximately in a straight line running through the zero point of the coordinate system. In this characteristic the magnetic flux lines are plotted as ordinates and the exciting ampere-turns as abscissæ. The induction is preferably made so great that during the operation the bend of the characteristic is not exceeded. A weak saturation of the iron and an air gap as small as possible may be made use of. For suppressing the hysteresis effect, it is advisable to make the magnetic core of the field electromagnet out of soft iron. The current sources represented by batteries 66, 93 and the supply line 75 may be combined into a single source of direct current feeding the entire system.

In addition a measuring device 94 is arranged in Fig. 4 to facilitate a manual correction of the regulating system. This device especially renders it possible to take into account the influence of occasional voltage variations. At the occurrence of voltage variations of the source 66 the voltage between 67 and 63 does not reach its normal value. In correspondence therewith the speed to be adjusted does not reach the desired value. Therefore a measuring device 94 of the voltmeter type is connected to the point 67 and the pointer 62 for indicating the number of revolutions of the machine 68. If desired the device 94 could be also calibrated for indicating voltages, but the before described scale advantageously permits adjusting the pointer 62 either by hand or automatically as long as the pointer of the device 94 indicates the desired number of revolutions. Thereby the influence of undesired voltage variations is compensated in the arrangement because the voltage divider 64 is now not regulated to a predetermined part of the battery voltage, but to an absolute voltage value which affords a clear relation to the desired effect.

Instead of a Wheatstone bridge any other kind of transmitting system can be used in carrying out the invention. Besides the voltage dividers represented in the drawing can be replaced by regulating resistances.

It will be readily understood that we do not limit ourselves to the exact details of construction of the arrangement illustrated by way of example and that these may be modified within the scope of our claims without departing from the spirit of our invention.

What we claim as our invention and desire to secure by Letters Patent is:—

1. In an arrangement for the regulation of machines, the combination of an electric motor, a pointer adapted to indicate the desired value of working of said motor, an electric system for regulating the speed of said motor in correspondence with the position of said pointer and a dynamo coupled to said motor, and electrically connected to said system to render the latter inoperative when the voltage of said dynamo reaches given values.

2. In an arrangement for the regulation of machines, the combination of an electric motor, a pointer adapted to indicate the desired value of working of said motor, a resistance arrangement for automatically regulating the exciting current of said motor in accordance with the position of said pointer and a dynamo coupled to said motor and electrically connected to said resistance arrangement to discontinue its regulating operations at a given value of the voltage generated by said dynamo.

3. In an arrangement for the regulation of machines, the combination of an electric motor, a pointer adapted to indicate the desired value of working of said motor, a voltage divider resistance arranged along the path of said pointer to contact therewith, means for regulating said motor in accordance with the voltage derived from said voltage divider and a dynamo coupled to said motor and electrically connected to said regulating means so as to balance the voltage derived from said voltage divider.

4. In an arrangement for the regulation of machines, the combination of an electric motor, a pointer adapted to indicate the desired value of working of said motor, a voltage divider resistance arranged along the path of said pointer to make contact therewith, means for regulating said motor in accordance with the voltage derived from said voltage divider and a dynamo coupled to said motor and electrically connected to said means so as to balance the voltage taken from said voltage divider, and a measuring device of the voltmeter type connected to said pointer and to one end of said voltage divider.

5. In an arrangement for the regulation of machines, the combination of an electric motor, a pointer adapted to indicate the desired value of working of said motor, a resistance arrangement for automatically regulating the exciting current of said motor in accordance with the position of said pointer, and a small dynamo having an electromagnetic field, said dynamo being driven by said motor and electrically connected to said resistance arrangement to discontinue the regulating operation of the latter at given values of the voltage generated by said dynamo, and a measuring device of the voltmeter type connected to said pointer and to one end of said voltage divider.

6. In an arrangement for the regulation of machines, the combination of an electric motor, a pointer adapted to indicate the desired value of working of said motor, a resistance arrangement for automatically regulating the exciting current of said motor in accordance with the position of said pointer, said resistance arrangement comprising a change-over relay, including its armature and an outside current source for polarizing said armature, and a small dynamo having a field electromagnet, said dynamo being driven by said motor and electrically connected to said resistance arrangement to discontinue the regulating operation of the latter at given values of the voltage generated by said dynamo, and a measuring device of the voltmeter type connected to said pointer and to one end of said voltage divider, the scale of said device being calibrated to indicate numbers of revolutions of said motor.

7. In an arrangement for the regulation of machines, the combination of an electric motor, a machine coupled to said motor, a pointer adapted to indicate the desired output of said machine, an electric system for regulating the speed of said motor in accordance with the position of said pointer and a small dynamo coupled to said motor, and suitable electric connections between said dynamo and said system which bring the voltage produced by the dynamo into opposition with the effective voltage in said system.

8. In an arrangement for the regulation of machines, the combination of an electric motor, a machine coupled to said motor, a pointer adapted to indicate the desired output of said machine, an electric system for regulating the speed of said motor in accordance with the position of said pointer and a small dynamo having a field electromagnet coupled to said motor and adapted to balance the voltage in said system, and a measuring device of the voltmeter type connected to said pointer and to one end of said voltage divider.

9. In an arrangement for the regulation of machines, the combination of an electric motor, a pointer adapted to indicate the desired value of working of said motor, a voltage divider resistance arranged along the path of said pointer, means for periodically closing a contact between said pointer and said resistance, other means for automatically regulating the speed of said motor, said last-named means being operated by the voltage taken from said voltage divider at the closing of the pointer contact, and a small dynamo having a field electromagnet driven by said motor and being electrically connected to said last-named means for balancing the voltage in the circuit of said means.

10. In a device for regulating machines in combination a machine to be regulated, a measuring device operating independent of the machine to be regulated, and adapted to indicate desired regulating values, an automatic regulating device interposed between said measuring device and the regulated machine and controlled in its functions by said measuring device, a second measuring device responsive to the varying output of said machine and means for controlling said regulating device also by said second measuring device, for maintaining the operation of the regulating device until the indications of the second measuring device agree with those of the first device.

11. In a device for regulating machines in combination an electric motor to be regulated, a measuring device operating independent of the machine to be regulated, and adapted to indicate regulating values for said motor, an automatic electric regulating device for said motor controlled in its functions by said measuring device, a second measuring device responsive to the operations of said electric motor and electric actuating means between said second measuring device and said motor regulating device for maintaining the operation of said regulating device until the indications of the second measuring device agree with those of the first measuring device.

In testimony whereof we affix our signatures.

MANFRED SCHLEICHER.
WILHELM LIESEGANG.